United States Patent
Carter et al.

(10) Patent No.: US 11,224,940 B2
(45) Date of Patent: Jan. 18, 2022

(54) POWDER BED CONTAINMENT SYSTEMS FOR USE WITH ROTATING DIRECT METAL LASER MELTING SYSTEMS

(71) Applicant: General Electric Company, Schenectady, NY (US)

(72) Inventors: William Thomas Carter, Galway, NY (US); Zhen Liu, Niskayuna, NY (US); Younkoo Jeong, Clifton Park, NY (US); Michael Robert Tucker, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 642 days.

(21) Appl. No.: 15/888,828

(22) Filed: Feb. 5, 2018

(65) Prior Publication Data
US 2019/0240774 A1    Aug. 8, 2019

(51) Int. Cl.
*B22F 3/105* (2006.01)
*B23K 26/08* (2014.01)
(Continued)

(52) U.S. Cl.
CPC ........ *B23K 26/0823* (2013.01); *B23K 26/082* (2015.10); *B23K 26/083* (2013.01);
(Continued)

(58) Field of Classification Search
CPC ............................ B23K 26/083; B23K 26/342; B23K 26/0823; B23K 26/082; B22F 2003/105;
(Continued)

(56) References Cited

U.S. PATENT DOCUMENTS

| 5,252,264 A | 10/1993 | Forderhase et al. |
| 6,325,961 B1 * | 12/2001 | Beers ...................... B29C 64/40 |
| | | 264/401 |

(Continued)

FOREIGN PATENT DOCUMENTS

| EP | 1704989 A2 | 9/2006 |
| EP | 3106288 A1 | 12/2016 |

(Continued)

OTHER PUBLICATIONS

Hauser et al., "Spiral growth manufacturing (SGM)—a continuous additive Manufacturing technology for processing metal powder by Selective laser melting", ResearchGate, pp. 1-12, Jan. 2005.

(Continued)

*Primary Examiner* — Charles P. Cheyney
(74) *Attorney, Agent, or Firm* — Dority & Manning, P.A.

(57) ABSTRACT

A powder bed containment system for use with a rotating direct metal laser melting (DMLM) system includes an annular build plate, which includes an inner wall, an outer wall concentric with the inner wall and spaced radially apart from the inner wall, and a substantially planar build surface extending between the inner wall and the outer wall, where the substantially planar build surface is arranged to receive a weldable powder for manufacture of an object. The powder bed containment system also includes an outer containment wall radially outward of the outer wall of the annular build plate, an inner containment wall radially inward of the inner wall of the annular build plate, and at least one actuator mechanically coupled to at least one of i) the outer containment wall and ii) the inner containment wall, where the at least one actuator is configured to raise at least one of i) the outer containment wall and ii) the inner containment wall axially relative to the substantially planar build surface during manufacture of the object.

20 Claims, 5 Drawing Sheets

(51) Int. Cl.
*B33Y 10/00* (2015.01)
*B23K 26/342* (2014.01)
*B33Y 30/00* (2015.01)
*B23K 26/082* (2014.01)

(52) U.S. Cl.
CPC ............ *B23K 26/342* (2015.10); *B33Y 10/00* (2014.12); *B33Y 30/00* (2014.12)

(58) Field of Classification Search
CPC ............... B22F 2003/1056; B22F 3/1055; B22F 10/20; B22F 10/10; B33Y 30/00; Y02P 10/25
USPC ............ 425/375, 78, 174.4; 219/76.1, 76.12, 219/76.14
See application file for complete search history.

(56) References Cited

U.S. PATENT DOCUMENTS

| | | | |
|---|---|---|---|
| 9,126,167 B2 | 9/2015 | Ljungblad | |
| 9,321,215 B2 | 4/2016 | Dudley | |
| 9,358,729 B2 | 6/2016 | Hofacker et al. | |
| 9,527,272 B2 | 12/2016 | Steele | |
| 9,597,730 B2 | 3/2017 | Mironets et al. | |
| 2014/0077421 A1 | 3/2014 | Minick | |
| 2014/0191439 A1 | 7/2014 | Davis | |
| 2015/0202687 A1 | 7/2015 | Pialot et al. | |
| 2015/0239179 A1* | 8/2015 | Goto | B22F 3/008 |
| | | | 428/206 |
| 2015/0314389 A1* | 11/2015 | Yamada | B29C 64/25 |
| | | | 219/76.1 |
| 2016/0067779 A1* | 3/2016 | Dautova | B29C 64/153 |
| | | | 419/7 |
| 2016/0114427 A1 | 4/2016 | Eibl et al. | |
| 2016/0129502 A1 | 5/2016 | Varetti | |
| 2016/0193695 A1 | 7/2016 | Haynes | |
| 2016/0288207 A1 | 10/2016 | Gambardella | |
| 2016/0368050 A1* | 12/2016 | Morris | B33Y 30/00 |
| 2017/0036404 A1 | 2/2017 | Rengers et al. | |
| 2017/0144874 A1* | 5/2017 | Huebinger | B66F 9/02 |
| 2017/0246678 A1 | 8/2017 | Bunker et al. | |
| 2017/0246689 A1 | 8/2017 | Garry | |
| 2018/0099332 A1* | 4/2018 | Shaw | B22F 3/003 |
| 2018/0311731 A1* | 11/2018 | Spicer | B22F 3/1055 |
| 2018/0345379 A1* | 12/2018 | Holford | B22F 3/24 |
| 2018/0345600 A1* | 12/2018 | Holford | B22F 5/10 |
| 2019/0009338 A1* | 1/2019 | Mcmurtry | B29C 64/153 |
| 2019/0143406 A1* | 5/2019 | Carter | B22F 3/1055 |
| | | | 264/109 |
| 2019/0337226 A1* | 11/2019 | Winiarski | B29C 64/20 |
| 2021/0046703 A1* | 2/2021 | Hoppe | B29C 64/232 |
| 2021/0229361 A1* | 7/2021 | TenHouten | B29C 64/153 |

FOREIGN PATENT DOCUMENTS

| | | |
|---|---|---|
| WO | 2014195068 A1 | 12/2014 |
| WO | WO2017/034951 A1 | 3/2017 |

OTHER PUBLICATIONS

U.S. Appl. No. 15/401,643, filed Jan. 9, 2017 entitled System and Methods for Fabricating a Component With Laser Array.
U.S. Appl. No. 15/438,326, filed Feb. 21, 2017 entitled Additive Manufacturing System and Method of Forming an Object in a Powder Bed.
U.S. Appl. No. 15/408,843, filed Jan. 18, 2017 entitled Systems and Methods for Additive Manufacturing Rotating Build Platforms.
U.S. Appl. No. 15/400,592, filed Jan. 6, 2017 entitled Systems and Methods for Additive Manufacturing Recoating.
U.S. Appl. No. 15/787,189, filed Oct. 18, 2017 entitled Scan Path Generation for a Rotary Additive Manufacturing Machine.
U.S. Appl. No. 15/824,206, filed Nov. 28, 2017 entitled Scan Path Correction for Movements Associated With an Additive Manufacturing Machine.
U.S. Appl. No. 15/810,308, filed Nov. 13, 2017 entitled Additive Manufacturing Apparatus and Method for Large Components.
Ji et al., "Fabrication of functionally graded properties by direct laser melting of compositionally selective metallic powder", 2015 15th International Conference on Control, Automation and Systems (ICCAS), pp. 1955-1957, Busan, Oct. 13-16, 2015.
Guo et al., "Design of a novel control slialegy for laser-aided additive manufacturing processes", IECON 2016—42nd Annual Conference of the IEEE Industrial Electronics Society, pp. 6091-6096, Florence, Oct. 23-26, 2016.
International Search Report Corresponding to Application No. PCT/US2019/013915 dated Apr. 25, 2019.

* cited by examiner

POWDER BED CONTAINMENT SYSTEMS FOR USE WITH ROTATING DIRECT METAL LASER MELTING SYSTEMS

BACKGROUND

The field of disclosure relates generally to additive manufacturing, and more particularly, to powder bed containment systems and methods for use with direct metal laser melting ("DMLM") systems, in which a system of containment walls arranged around an annular build plate is incrementally raised around the build plate during manufacture to contain a powder bed deposited, in successive layers, on the build plate.

Additive manufacturing systems (also known as 3D printing systems) are used to create three-dimensional objects by forming such objects from successive layers of material. Typically, additive manufacturing systems operate under computer control (such as, for example, based upon a three-dimensional computer aided design and drafting ("CAD") model of an object to be manufactured). Build materials are wide-ranging and include, for example, materials such as metals, glasses, thermoplastics, inks, various construction materials, such as concrete, and the like.

Accordingly, in the realm of additive manufacturing systems, DMLM systems are those arranged to weld successive layers of a weldable powder, such as a metal powder, to create a desired three-dimensional object. Traditional DMLM systems include a build plate enclosed by a system of fixed powder bed containment walls. Powder is deposited on the build plate and welded, in successive layers, to construct the object. To accommodate each successive layer of powder (e.g., a deepening powder bed), the build plate is progressively lowered within the system of fixed containment walls.

Drawbacks associated with conventional DMLM systems include sequential powder deposition and welding phases, resulting, for example, in periods of time during which welding operations are not performed (e.g., system latencies). Other drawbacks include utilization of excess quantities of weldable powder, object size constraints, relatively slow build rates, stationary powder bed containment walls, and axially descending, non-rotating, build plates.

A powder bed containment system for use with rotating DMLM systems is therefore desirable. More particularly, a powder bed containment system that includes a plurality of containment walls arranged around an annular build plate is desirable. Moreover, a powder bed containment system in which the plurality of containment walls are incrementally raised around an axially fixed, rotating, build plate is desirable, such as, for example, to contain a powder bed deposited, in successive layers, on the build plate.

BRIEF DESCRIPTION

In one aspect, a powder bed containment system for use with a rotating direct metal laser melting (DMLM) system is provided. The powder bed containment system includes an annular build plate, which includes an inner wall, an outer wall concentric with the inner wall and spaced radially apart from the inner wall, and a substantially planar build surface extending between the inner wall and the outer wall, where the substantially planar build surface is arranged to receive a weldable powder for manufacture of an object. The powder bed containment system also includes an outer containment wall radially outward of the outer wall of the annular build plate, an inner containment wall radially inward of the inner wall of the annular build plate, and at least one actuator mechanically coupled to at least one of i) the outer containment wall and ii) the inner containment wall, where the at least one actuator is configured to raise at least one of i) the outer containment wall and ii) the inner containment wall axially relative to the substantially planar build surface during manufacture of the object.

In another aspect, a powder bed containment system for use with a rotating DMLM system is provided. The powder bed containment system includes an annular build plate arranged to receive a weldable powder, a system of containment walls surrounding the annular build plate, and at least one actuator mechanically coupled to the system of containment walls, where the at least one actuator is configured to raise the system of containment walls axially relative to the annular build plate during manufacture of an object from the weldable powder.

In yet another aspect, a method of containing a powder bed on an annular build plate in a rotating DMLM system is provided. The method includes receiving a first layer of weldable powder on an annular build surface of the annular build plate, where the first layer of weldable powder is selectively welded on the annular build surface by a laser scanner. The method also includes raising an outer containment wall disposed about an outer wall of the annular build plate by an incremental distance, raising an inner containment wall disposed about an inner wall of the annular build plate by the incremental distance, receiving a second layer of weldable powder on the annular build surface of the annular build plate. To accommodate successive layers of powder (e.g., a deepening powder bed), the walls are progressively raised.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, spatially relative terms, such as "beneath," "below," "under," "lower," "higher," "above," "over," and the like, may be used to describe one element or feature's relationship to one or more other elements or features as illustrated in the figures. It will be understood that such spatially relative terms are intended to encompass different orientations of the elements and features described herein both in operation as well as in addition to the orientations depicted in the figures. For example, if an element or feature in the figures is turned over, elements described as being "below" one or more other elements or features may be regarded as being "above" those elements or features. Thus, exemplary terms such as "below," "under," or "beneath" may encompass both an orientation of above and below, depending, for example, upon a relative orientation between such elements or features and one or more other elements or features.

As used herein, a "weldable powder" is any commercially available powder capable of and/or designed for use with a laser welding system. For example, a weldable powder may include a weldable (e.g., meltable and/or sinterable) metal powder. However, in other embodiments, a weldable powder may include a polymer or thermoplastic powder, a glass powder, and/or any other suitable weldable powder.

In addition, as used herein, and as described in greater detail below, a "powder bed" is a volume of weldable powder deposited on a build plate. Such a volume of powder may be deposited layer by layer, over time, such as, for example, as the build plate rotates.

Although the additive manufacturing techniques described herein are generally described in relation to direct metal laser melting (DMLM) systems, it will be appreciated that various other additive manufacturing techniques are contemplated and within the scope of this disclosure. For example, additive manufacturing techniques suitable for implementation with the subject matter described herein may include, but are not limited to, vat photopolymerization, powder bed fusion, binder jetting, material jetting, sheet lamination, material extrusion, directed energy deposition, and the like.

Other additive manufacturing systems which may be suitable for implementation in conjunction with the present disclosure include SLA—Stereolithography Apparatus, DLP—Digital Light Processing, 3 SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. In some cases, the additive manufacturing techniques listed above may employ, for example, and without limitation, any suitable form of electromagnetic radiation, heating, sintering, melting, curing, binding, consolidating, pressing, embedding, and/or combinations thereof.

Embodiments of the present disclosure relate to a powder bed containment system in which a powder bed deposited on a rotating build plate during welding operations is contained on the build plate. More particularly, a plurality of containment walls are incrementally raised around the build plate as successive layers of a weldable powder are deposited on the build plate. To raise the containment walls, one or more linear actuators are mechanically coupled to one or more of the containment walls. In some embodiments, the linear actuators rotate with the build plate. In other embodiments, the linear actuators are fixedly mounted on a support surface apart from the build plate and do not rotate with the build plate.

Figure 1:
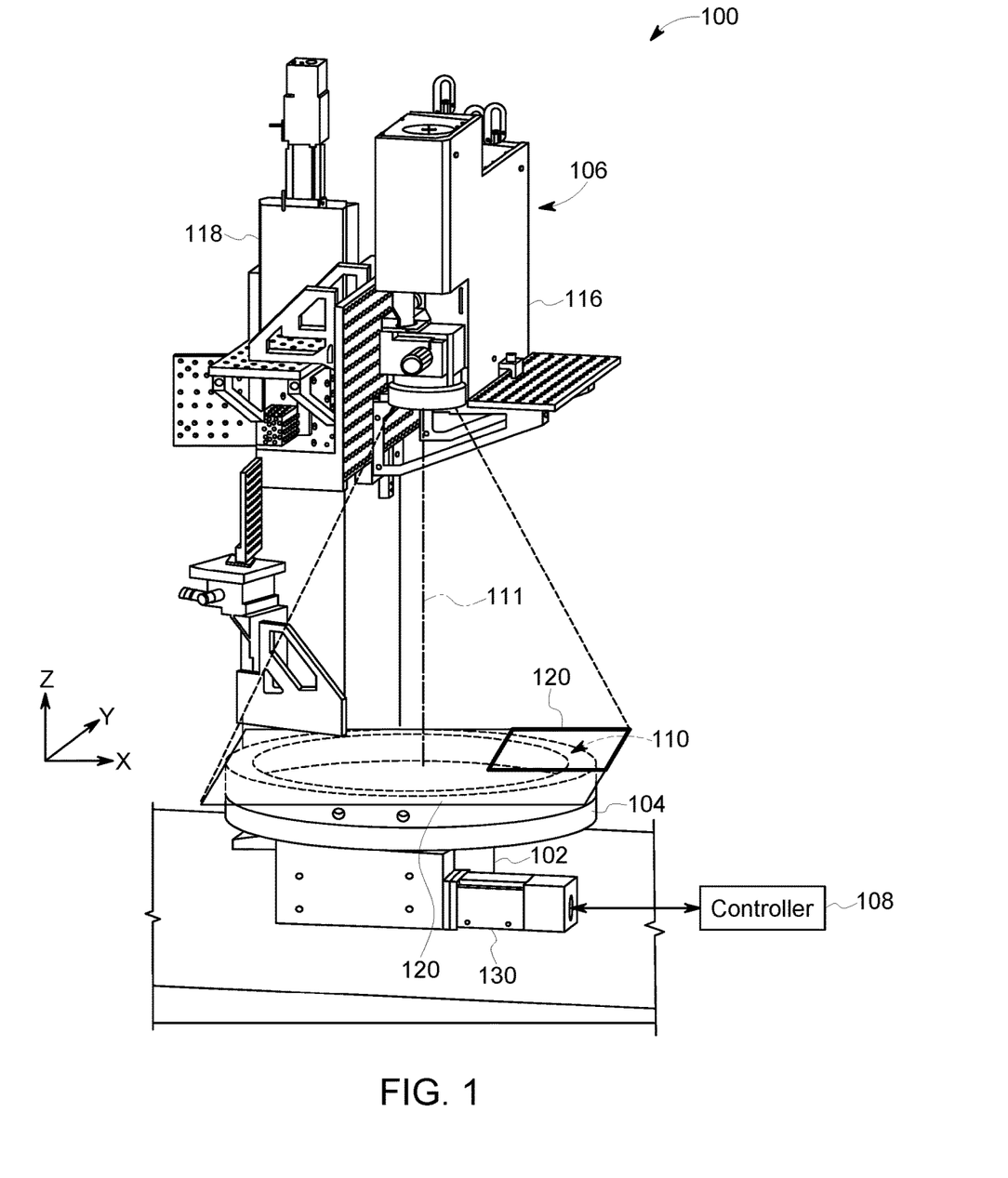
FIG. 1 is a perspective view of an exemplary rotating direct metal laser melting ("DMLM") system.

FIG. 1 is a perspective view of an exemplary rotating direct metal laser melting ("DMLM") system 100. In general, system 100 includes a rotatable base 102, a powder bed containment system 104 supported on rotatable base 102, a laser scanner system 106, and a controller 108.

Rotatable base 102 is any structure capable of supporting powder bed containment system 104 and rotation about a centerline 111. A motor, such as an electric motor 130, may be mechanically coupled to rotatable base 102 and may be arranged to engage with rotatable base 102 to cause rotatable base 102 to rotate. Rotatable base 102 may include a variety of other components; however, these components are not central to an understanding of the present disclosure and are not described in detail herein. Those of skill will appreciate that a variety of rotatable bases (e.g., turntables) suitable for implementation as rotatable base 102 are available and may be variously implemented in accordance with the present disclosure.

In general, powder bed containment system 104 includes an annular build plate 110 and a plurality of containment walls (described in detail below) arranged around and/or surrounding annular build plate 110. Several embodiments of powder bed containment system 104 are described below with reference to FIGS. 2-5.

Laser scanner system 106 is any suitable laser scanner system, such as a laser scanner system capable of one or more degrees of freedom of linear motion about one or more axes, such as about the x, y, and/or z-axes. In general terms, laser scanner system 106 may include at least one laser scanner 116, such as at least one commercially available raster scanning and/or vector scanning laser scanner. Laser scanner 116 may be mechanically coupled to and mounted on a linear actuator assembly 118, which may permit laser scanner 116 to translate parallel to any of the x, y, and/or z-axes. In operation, laser scanner 116 may be positioned on actuator assembly 118 relative to powder bed containment system 104, such that at least a portion of powder bed containment system 104 is within a field of view 120 of laser scanner 116. Within field of view 120, laser scanner 116 is capable of selectively welding powder deposited on build plate 110 of powder bed containment system 104.

Accordingly, to construct an object, a weldable powder, such as a weldable metal powder, is deposited on build plate 110, and powder bed containment system 104 is rotated, on rotatable base 102, under laser scanner 116. As each portion of the powder covered build plate 110 passes within field of view 120, laser scanner 116 selectively welds the powder to construct a layer of the object. Successive rotations permit welding of successive layers of the object until construction of the object is completed.

Additional detail related to laser scanner system 106 (and more broadly, to rotating DMLM system 100) may be obtained with reference to U.S. patent application Ser. No. 15/888,727, entitled ROTATING DIRECT METAL LASER MELTING SYSTEMS AND METHODS OF OPERATION, filed Feb. 5, 2018, which is hereby incorporated by reference in its entirety.

In general, controller 108 coordinates welding and powder bed containment system operations performed by system 100. To this end, and in some embodiments, controller 108 includes one or more computer processors communicatively coupled to one or more tangible, non-transitory, computer-readable, memory devices. In some embodiments, controller 108 retrieves a three-dimensional computer-aided design and drafting ("CAD") model from a computer-readable memory device and coordinates the motion and/or operations of one or more components of system 100, such as one or more components of powder bed containment system 104, to manufacture an object, such as an object corresponding to and/or defined by the CAD model, within powder bed containment system 104. For example, as described herein, controller 108 may coordinate the motion, position, orientation, and/or operations of rotatable base 102, powder bed containment system 104, and/or laser scanner system 106.

Figure 2:
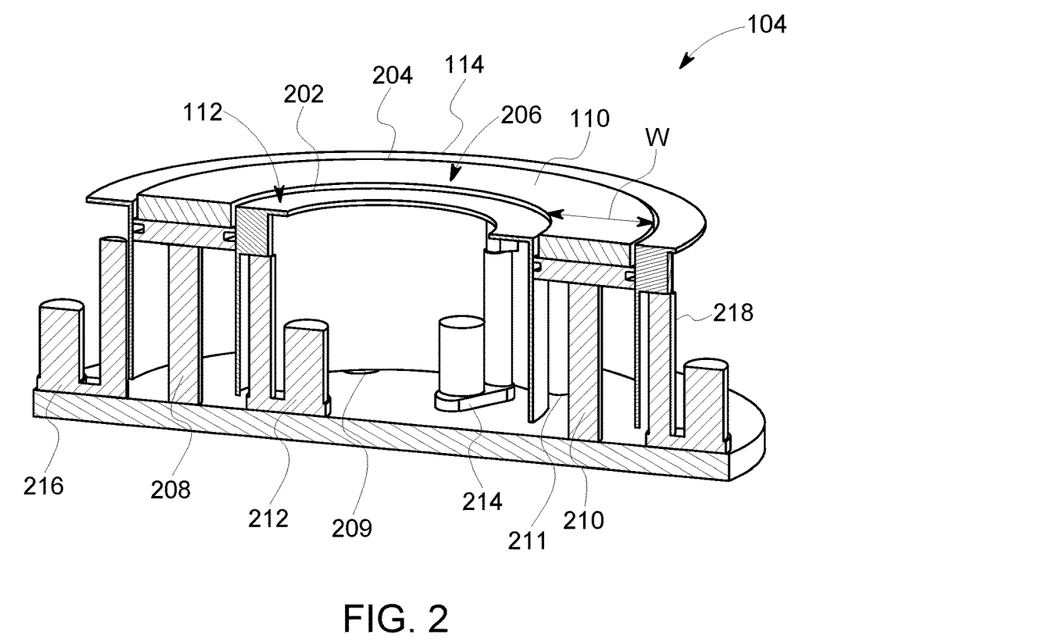
FIG. 2 is a cross-sectional view of a first exemplary embodiment of a powder bed containment system for use with the rotating DMLM system shown in FIG. 1.
Figure 3:
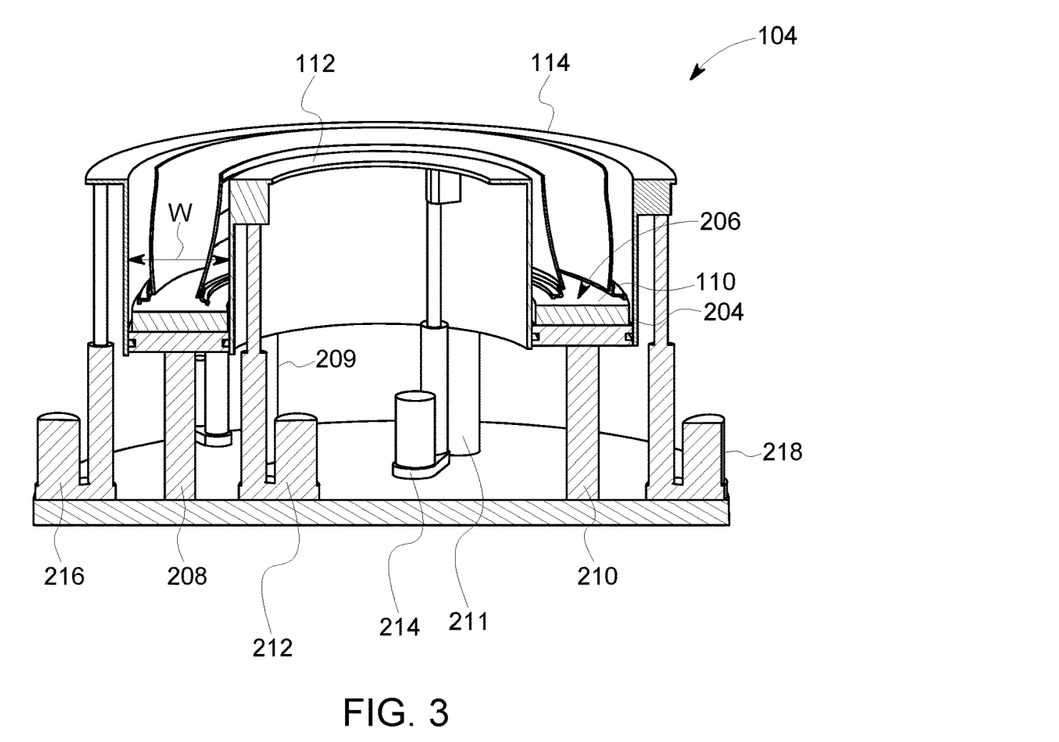
FIG. 3 is a cross-sectional view of the first exemplary embodiment of the powder bed containment system shown in FIG. 2 in a raised position.

FIG. 2 is a cross-sectional view of a first embodiment of powder bed containment system 104 (for use with DMLM system 100, as shown in FIG. 1) in a lowered position. Similarly, FIG. 3 is a cross-sectional view of the first embodiment of powder bed containment system 104 in a raised position.

Accordingly, in the first embodiment, and with specific reference to FIG. 2, powder bed containment system 104 includes, as described above, annular build plate 110. Annular build plate 110 includes, as shown, an inner wall 202 and an outer wall 204. Outer wall 204 is concentric with and spaced radially apart from inner wall 202. A substantially planar build surface 206 of build plate 110 extends between inner wall 202 and outer wall 204. A width, W, of build plate 110 is defined between inner wall 202 and outer wall 204.

Annular build plate 110 is mounted on a plurality of stanchions, such as a first stanchion 208, a second stanchion 210, a third stanchion 209, and a fourth stanchion 211, all of which extend between annular build plate 110 and rotatable base 102, and which function to mechanically couple annular build plate 110 to rotatable base 102. More particularly, in at least some embodiments, a build plate support member (not shown) may be disposed or sandwiched between build plate 110 and any stanchion 208-211. Such a build plate support member may include a grooved surface configured to form a powder seal between a respective stanchion 208-211 and build plate 110. Thus, annular build plate 110 is raised on stanchions 208-211 a predefined distance above rotatable base 102 and mechanically coupled to rotatable base 102, such that annular build plate 110 is able to rotate with rotatable base 102. Although four stanchions 208-211 are shown, it will be appreciated that any suitable number of stanchions may be implemented.

As described briefly above, powder bed containment system 104 also includes a plurality of annular containment walls, such as an annular inner containment wall 112 and an annular outer containment wall 114. Outer containment wall 114 is concentric about inner containment wall 112 and spaced radially apart from inner containment wall 112, such as by the width, W, of build plate 110. Specifically, inner containment wall 112 is mounted slightly radially inward of inner wall 202, such that inner containment wall 112 extends orthogonally to build surface 206 and abuts inner wall 202. In some embodiments, a sealing ring (not shown) may be disposed between inner wall 202 and inner containment wall 112. Similarly, outer containment wall 114 is mounted slightly radially outward of outer wall 204, such that outer containment wall 114 extends orthogonally to build surface 206 and abuts outer wall 204. In some embodiments, a sealing ring (not shown) may be disposed between outer wall 204 and outer containment wall 114.

A first plurality of linear actuators, such as a first linear actuator 212 and a second linear actuator 214, are mounted on rotatable base 102 and arranged radially inward of inner containment wall 112. First linear actuator 212 and second linear actuator 214 are mechanically coupled to inner containment wall 112 and are configured to selectively raise and lower inner containment wall 112 parallel to the z-axis. Similarly, a second plurality of linear actuators, such as a third linear actuator 216 and a fourth linear actuator 218, are mounted on rotatable base 102 and arranged radially outward of outer containment wall 114. Third linear actuator 216 and fourth linear actuator 218 are mechanically coupled to outer containment wall 114 and are configured to selectively raise and lower outer containment wall 114 parallel to the z-axis. Although four linear actuators 212-218 are shown and described, it will be appreciated that any suitable number of linear actuators may be implemented.

In operation, a weldable powder is deposited on build surface 206 of annular build plate 110, such as, for example, during rotation of build plate 110. Specifically, the powder is deposited in successive layers, each of which is selectively welded, as build plate 110 rotates, by laser scanner system 106. As described above, the volume of powder deposited and accumulating on build surface 206 may be referred to as a "powder bed."

Accordingly, to contain the powder bed on build surface 206, inner containment wall 112 and outer containment wall 114 are translated or raised orthogonally relative to build surface 206, such as, for example, by linear actuators 212-218. More particularly, as best shown with respect to FIG. 2, inner containment wall 112 and outer containment wall 114 may begin from a start position in which each containment wall 112 and 114 is lowered and substantially flush with build surface 206. As the powder bed is deposited on build surface 206, inner containment wall 112 and outer containment wall 114 may be gradually and/or incrementally raised, such as by controller 108, relative to build surface 206. Containment walls 112 and 114 are shown in a raised position in FIG. 3. In addition, the incremental distance by which containment walls 112 and 114 are raised may be equal to the thickness of a single layer of powder, such that containment walls 112 and 114 are gradually raised as layers of powder are deposited to contain each successive layer. Further, controller 108 may coordinate the motion of containment walls 112 and 114, such that containment walls 112 and 114 are raised in tandem.

Figure 4:
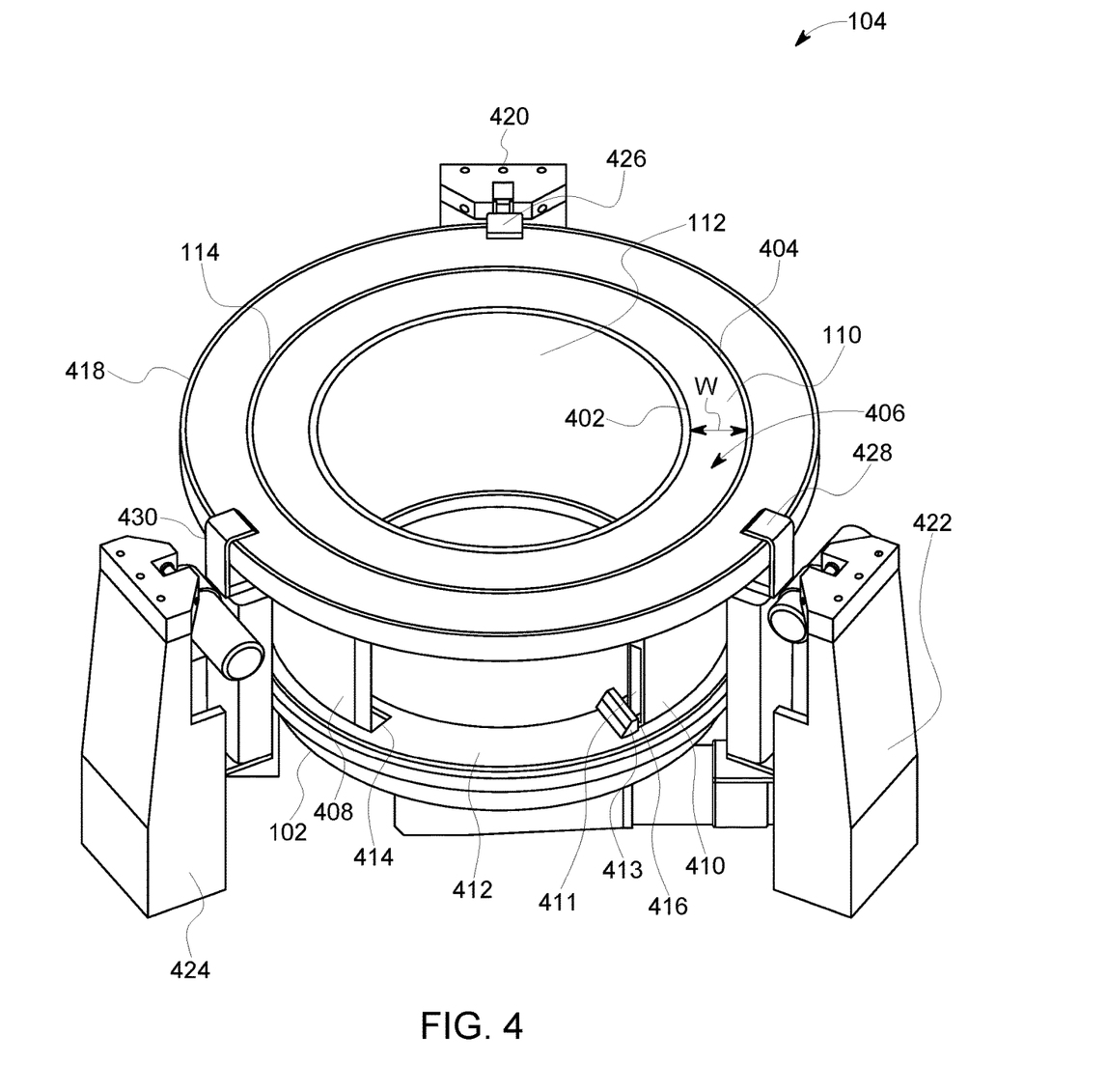
FIG. 4 is a cross-sectional view of a second exemplary embodiment of a powder bed containment system for use with the rotating DMLM system shown in FIG. 1.
Figure 5:
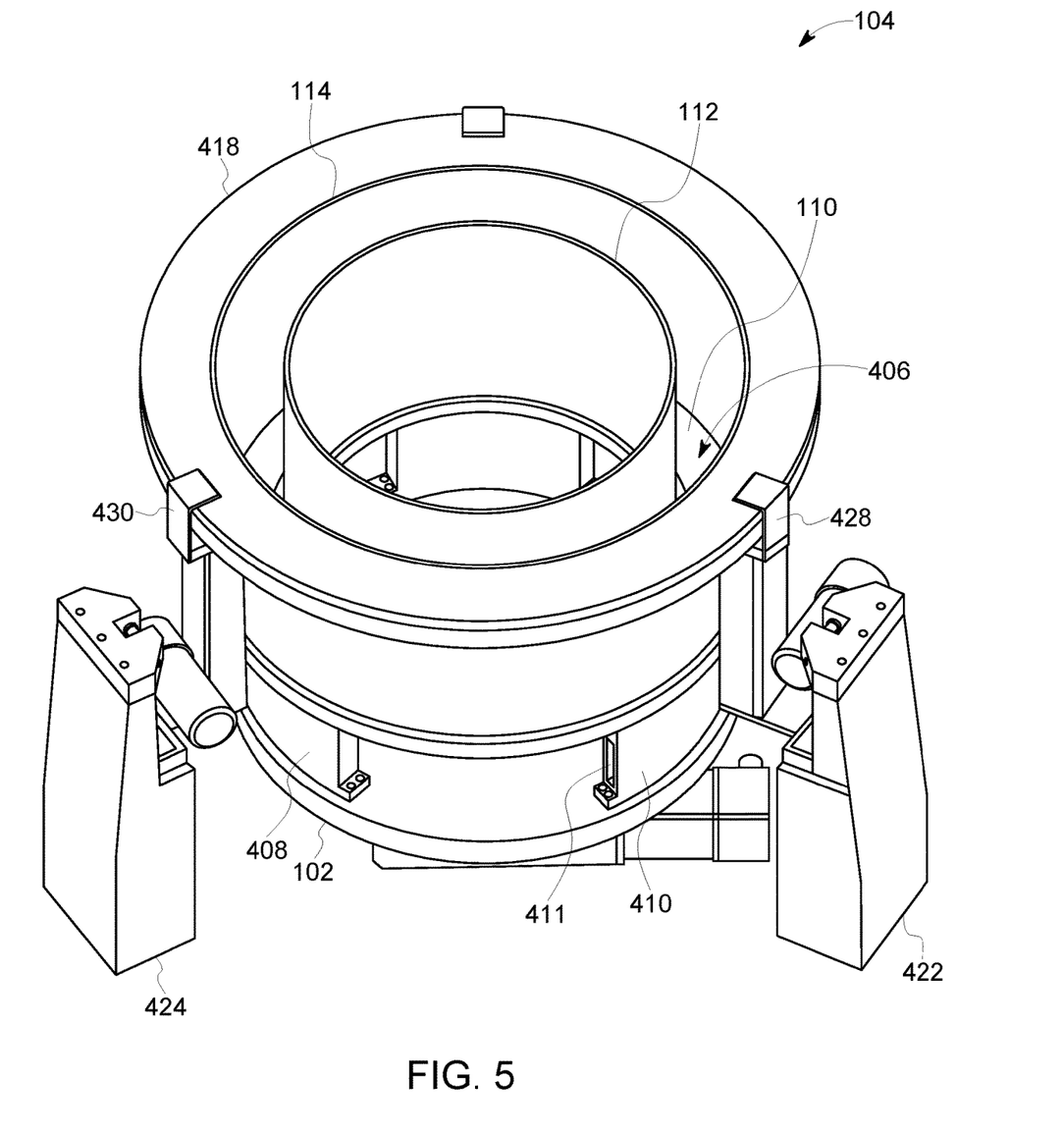
FIG. 5 is a cross-sectional view of the second exemplary embodiment of the powder bed containment system shown in FIG. 4 in a raised position.

FIG. 4 is a cross-sectional view of a second exemplary embodiment of powder bed containment system 104 (for use with rotating DMLM system 100, as shown in FIG. 1) in a lowered position. Similarly, FIG. 5 is a cross-sectional view of the second embodiment of powder bed containment system 104 in a raised position. The second embodiment is similar to the first embodiment (described above with respect to FIGS. 2 and 3), except, for example, that containment walls 112 and 114 are interlinked and actuated differently.

Accordingly, with specific reference to FIG. 4, in the second exemplary embodiment, powder bed containment system 104 includes, as described above, annular build plate 110. Annular build plate 110 includes, as shown, an inner wall 402 and an outer wall 404. Outer wall 404 is concentric with and spaced radially apart from inner wall 402. A substantially planar build surface 406 of build plate 110 extends between inner wall 402 and outer wall 404. A width, W, of build plate 110 is defined between inner wall 402 and outer wall 404.

Annular build plate 110 is mounted on a plurality of stanchions, such as a first stanchion 408 and a second stanchion 410, both of which extend between annular build plate 110 and rotatable base 102, and which function to mechanically couple annular build plate 110 to rotatable base 102. As described above, in at least some embodiments, a build plate support member (not shown) may be disposed or sandwiched between build plate 110 and any stanchion 408-410. Such a build plate support member may include a grooved surface configured to form a powder seal between a respective stanchion 408-410 and build plate 110. Thus, annular build plate 110 is raised on stanchions 408 and 410 a predefined distance above rotatable base 102 and mechanically coupled to rotatable base 102, such that annular build plate 110 is able to rotate with rotatable base 102. In some embodiments, one or more stanchions 408 and 410 includes a groove, such as a groove 411, configured to engage with a guide block, such as a guide block 413, mounted on a bottom flange 412 (described below). Further, although only two stanchions 408 and 410 and a single guide block 413 and groove 411 are shown, it will be appreciated that any suitable number of stanchions, guide blocks, and grooves may be implemented.

As described briefly above, powder bed containment system 104 also includes annular inner containment wall 112 and annular outer containment wall 114. Outer containment wall 114 is concentric about inner containment wall 112 and spaced radially apart from inner containment wall 112, such as by the width, W, of build plate 110. Specifically, inner containment wall 112 is mounted slightly radially inward of inner wall 402, such that inner containment wall 112 extends orthogonally to build surface 406 and abuts inner wall 402. In some embodiments, a sealing ring (not shown) may be disposed between inner wall 402 and inner containment wall 112. Similarly, outer containment wall 114 is mounted slightly radially outward of outer wall 404, such that outer containment wall 114 extends orthogonally to build surface 406 and abuts outer wall 404. In some embodiments, a sealing ring (not shown) may be disposed between outer wall 404 and outer containment wall 114.

In addition, and in this embodiment, inner containment wall 112 is joined to outer containment wall 114 by bottom flange 412, which includes a plurality of slots, such as a first slot 414 and a second slot 416, through which each stanchion 408 and 410 passes, respectively. In other words, first stanchion 408 passes through first slot 414, and second stanchion 410 passes through second slot 416. Moreover, outer containment wall 114 includes an annular rim 418 that extends radially outward of build plate 110 and that is configured to be engaged by one or more linear actuators, as described below.

Specifically, a plurality of linear actuators, such as a first linear actuator 420, a second linear actuator 422, and a third linear actuator 424, are mounted on a support surface (not shown) apart from rotatable base 102 (e.g., a support surface underlying or supporting rotatable base 102), such that each linear actuator 420-424 does not rotate with rotatable base 102. Each linear actuator 420-424 is arranged radially outward of outer containment wall 114 and engages with annular rim 418 of outer containment wall 114.

For example, each linear actuator 420-424 includes a bearing transfer assembly, such as a ball bearing transfer assembly, configured to engage with and support rim 418. Specifically, first linear actuator 420 includes first ball bearing transfer assembly 426, second linear actuator 422 includes a second ball bearing transfer assembly 428, and third linear actuator 424 includes a third ball bearing transfer assembly 430. Each ball bearing transfer assembly 426-430 includes a ball bearing (or ball bearings) (not shown) arranged to support rim 418 and on which rim 418 is able to rotate. Thus, as described below, as powder bed containment system 104 rotates on build plate 102 (as described above), linear actuators 420-424 are able to raise and/or lower powder bed containment system 104 parallel to the z-axis. Finally, although three linear actuators 420-424 are shown and described, it will be appreciated that any suitable number of linear actuators may be implemented.

In operation, a weldable powder is deposited on build surface 406 of annular build plate 110, such as, for example, during rotation of build plate 110. Specifically, the powder is deposited in successive layers, each of which is selectively welded, as build plate 110 rotates, by laser scanner system 106. As described above, the volume of powder deposited and accumulating on build surface 406 may be referred to as a "powder bed."

Accordingly, to contain the powder bed on build surface 406, inner containment wall 112 and outer containment wall 114 are translated or raised orthogonally relative to build surface 406, such as, for example, by linear actuators 420-424. More particularly, as best shown with respect to FIG. 4, inner containment wall 112 and outer containment wall 114 may begin from a start position in which each containment wall 112 and 114 is lowered and substantially flush with build surface 406. As the powder bed is deposited on build surface 406, inner containment wall 112 and outer containment wall 114 may be gradually and/or incrementally raised, such as by controller 108, relative to build surface 406. As described above, containment walls 112 and 114 are also allowed to rotate on ball bearing transfer assemblies 426-430, while linear actuators 420-424 are fixedly supported on a non-rotating support surface apart from rotatable base 102. Containment walls 112 and 114 are shown in a raised position with respect to FIG. 5.

In addition, the incremental distance by which containment walls 112 and 114 are raised may be equal to the thickness of a single layer of powder, such that containment walls 112 and 114 are gradually raised as layers of powder are deposited to contain each successive layer. Further, controller 108 may coordinate the motion of containment walls 112 and 114, such that containment walls 112 and 114 are raised in tandem.

Figure 6:
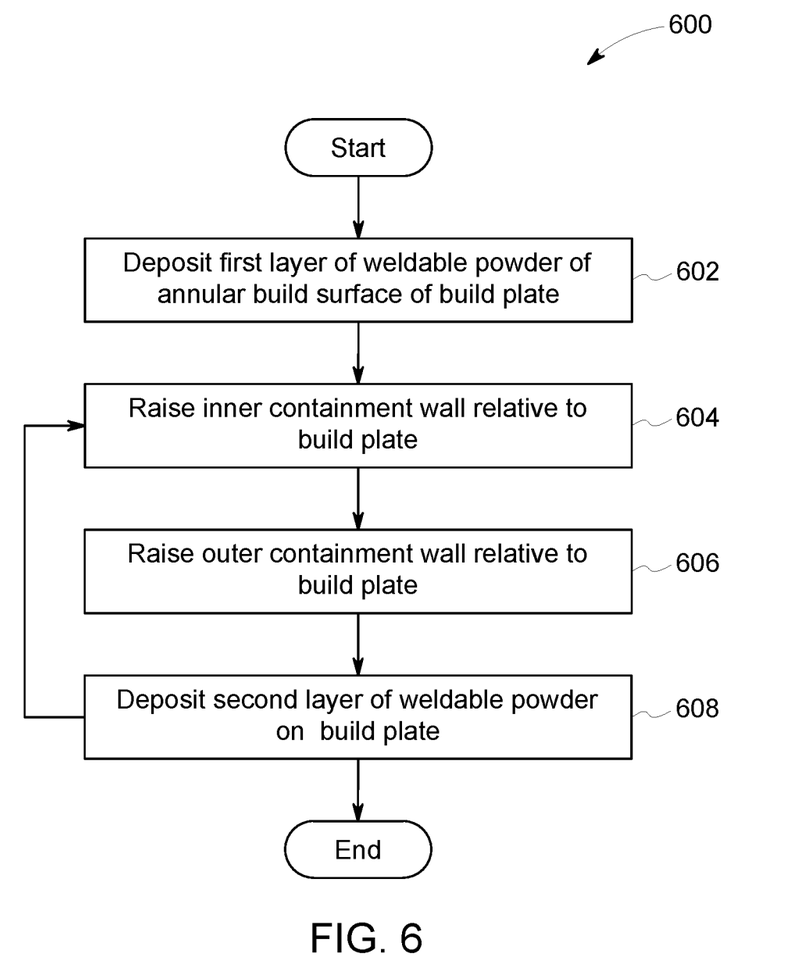
FIG. 6 is a flowchart illustrating a process of containing a powder bed on an annular build plate in the rotating DMLM system shown in FIG. 1.

FIG. 6 is a flowchart illustrating a process 600 of containing a powder bed on annular build plate 110 (shown in FIGS. 2-5) in rotating DMLM system 100 (shown in FIG. 1). Accordingly, in at least some embodiments, a first layer of weldable powder is deposited (and received) on an annular build surface (e.g., annular build surface 206 or 406) of build plate 110 (step 602). As described herein, the first layer of powder is selectively welded on build plate 110, and inner containment wall 112 is raised relative to annular build plate 110 (step 604). Similarly, outer containment wall 114 is raised relative to annular build plate 110, such as in tandem with inner containment wall 112 (step 606). As described above, inner containment wall 112 and outer containment wall 114 may be raised by a depth of a single layer of powder. Once raised, a second layer of weldable powder may be deposited (and received) on annular build surface (e.g., annular build surface 206 or 406) of build plate 110 (step 608). Thereafter, the welding, containment wall raising, and powder deposition steps may repeat, level after consecutive level, until an object is completely welded on build plate 110.

Embodiments of the powder bed containment systems, as described above, facilitate containment of a powder bed on a rotating build plate during welding operations. More particularly, a plurality of containment walls are incrementally raised around the build plate as successive layers of a weldable powder are deposited on the build plate. To raise the containment walls, one or more linear actuators are mechanically coupled to one or more of the containment walls. In some embodiments, the linear actuators rotate with the build plate. In other embodiments, the linear actuators are fixedly mounted on a support surface apart from the build plate and do not rotate with the build plate.

Exemplary technical effects of the DMLM system described herein include, for example: (a) containment of a powder bed on a rotating build plate of a rotating DMLM system; (b) an axially fixed build plate that is not lowered as the powder bed deepens; and (c) a plurality of containment walls surrounding the rotating build plate that are configured to translate axially with respect to the build plate as the powder bed deepens.

Exemplary embodiments of a powder bed containment system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where additive manufacturing is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A powder bed containment system for use in a powder bed fusion process, the system comprising:
    a rotatable base;
    an annular build plate coupled to the rotatable base;
    an annular outward containment wall disposed radially outward from and concentric to the annular build plate, wherein the annular outward containment wall extends orthogonally relative to the annular build plate;
    an annular inward containment wall disposed radially inward from and concentric to the annular build plate, wherein the annular inward containment wall extends orthogonally relative to the annular build plate;
    one or more actuators disposed radially outward from the rotatable base and supported or supportable by a non-rotating support surface;
    wherein the annular outward containment wall is rotatably coupled to the one or more actuators; and
    wherein the one or more actuators, when actuated, raise the annular outward containment wall relative to the annular build plate.

2. The powder bed containment system of claim 1, wherein the annular outward containment wall and the annular inward containment wall are coupled to one another.

3. The powder bed containment system of claim 1, comprising:
    a bottom flange coupled to the annular outward containment wall and the annular inward containment wall, wherein the one or more actuators raising the annular outward containment wall raises the annular inward containment wall relative to the annular build plate.

4. The powder bed containment system of claim 3, comprising:
    one or more stanchions coupling the annular build plate to the rotatable base.

5. The powder bed containment system of claim 4, wherein the bottom flange comprises one or more slots respectively corresponding to the one or more stanchions, wherein the one or more stanchions respectively pass through a corresponding one of the one or more slots.

6. The powder bed containment system of claim 1,
    one or more bearing transfer assemblies, wherein the annular outward containment wall is rotatably coupled to the one or more actuators at least in part by the one or more bearing transfer assemblies.

7. The powder bed containment system of claim 6, wherein the annular outward containment wall comprises an annular rim, and wherein the one or more bearing transfer assemblies engage with the annular rim.

8. The powder bed containment system of claim 1, wherein the one or more actuators are disposed radially outward from the annular outward containment wall.

9. The powder bed containment system of claim 1, wherein the one or more actuators comprises a plurality of actuators disposed radially outward from the annular outward containment wall.

10. The powder bed containment system of claim 1, comprising:

one or more additional actuators, the one or more additional actuators disposed radially inward from the annular build plate and/or from the annular inward containment wall;

wherein the one or more additional actuators, when actuated, raise the annular inward containment wall relative to the annular build plate.

11. The powder bed containment system of claim 10, wherein the one or more additional actuators are coupled to the rotatable base and the annular inward containment wall.

12. The powder bed containment system of claim 1, wherein the annular outward containment wall comprises a support rim, and wherein the one or more actuators engage with the support rim.

13. The powder bed containment system of claim 1, comprising at least one of:
a sealing ring disposed between the annular build plate and the annular outward containment wall; and
a sealing ring disposed between the annular build plate and the annular inward containment wall.

14. The powder bed containment system of claim 1, comprising:
a motor coupled to the rotatable base, the motor configured to cause the rotatable base to rotate.

15. An apparatus for additively manufacturing three-dimensional objects, the apparatus comprising:
a laser scanner system configured to selectively weld sequential layers of a powder material; and
a powder bed containment system configured to contain the sequential layers of the powder material, the powder bed containment system comprising:
a rotatable base;
an annular build plate coupled to the rotatable base;
an annular outward containment wall disposed radially outward from and concentric to the annular build plate, wherein the annular outward containment wall extends orthogonally relative to the annular build plate;
an annular inward containment wall disposed radially inward from and concentric to the annular build plate, wherein the annular inward containment wall extends orthogonally relative to the annular build plate;
one or more actuators disposed radially outward from the rotatable base and supported or supportable by a non-rotating support surface;
wherein the annular outward containment wall is rotatably coupled to the one or more actuators; and
wherein the one or more actuators, when actuated, raise the annular outward containment wall relative to the annular build plate.

16. A method of additively manufacturing a three-dimensional object using a powder bed fusion process, the method comprising:
receiving a first layer of powder on an annular build plate, the annular build plate coupled to a rotatable base;
raising, with one or more actuators, an annular outward containment wall relative to the annular build plate, wherein the one or more actuators are disposed radially outward from the rotatable base and are supported by a non-rotating support surface, and wherein the annular outward containment wall is disposed radially outward from and concentric to the annular build plate and extends orthogonally relative to the annular build plate, the annular outward containment wall at least partially containing the powder; and
receiving a second layer of powder on the annular build plate, the second layer of powder applied on top of the first layer of powder.

17. The method of claim 16, comprising:
rotating the rotatable base, wherein the annular outward containment wall is rotatably coupled to the one or more actuators.

18. The method of claim 16, comprising:
further at least partially containing the powder with an annular inward containment wall extending orthogonally relative to the annular build plate, the annular inward containment wall disposed radially inward from and concentric to the annular build plate.

19. The method of claim 18, comprising:
wherein the annular outward containment wall and the annular inward containment wall are coupled to one another by a bottom flange, wherein raising the annular outward containment wall raises the annular inward containment wall relative to the annular build plate.

20. The method of claim 18, comprising:
raising, with one or more additional actuators, the annular inward containment wall relative to the annular build plate, the one or more additional actuators disposed radially inward from the annular build plate and/or from the annular inward containment wall.

* * * * *